United States Patent Office 3,489,770
Patented Jan. 13, 1970

3,489,770
1-CYCLO(LOWER)ALKANOYL OR ADMAN-
TANYLCARBONYL - 3 - (2-SUBSTITUTED
ETHYL)INDOLES
David R. Herbst, King of Prussia, Pa., assignor to American Home Products Corporation, New York, N.Y., a corporation of Delaware
No Drawing. Application Jan. 18, 1966, Ser. No. 521,431, which is a continuation-in-part of application Ser. No. 383,971, July-20, 1964. Divided and this application Dec. 18, 1967, Ser. No. 720,423
Int. Cl. C07d 27/26, 99/04; A61k 27/00
U.S. Cl. 260—326.15     3 Claims

ABSTRACT OF THE DISCLOSURE

This invention relates to compounds of the formula

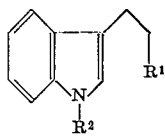

wherein R′ is a substituted amino group and R² is cyclo (lower) alkanoyl or adamantanylcarbonyl, which possess anti-inflammatory, hypotensive, hypoglycemic and central nervous system activity.

———

This is a division of application Ser. No. 521,431, filed Jan. 18, 1966, now abandoned, which in turn is a continuation-in-part of application Ser. No. 383,971, filed on July 20, 1964, and now abandoned.

This invention relates to new and useful indole compounds as well as to the novel method for their preparation. In particular, the present invention is concerned with 1-substituted-3-(2-substituted ethyl)indoles having pharmacodynamic activity.

The new compounds included within the purview of this invention are represented by the following general formula:

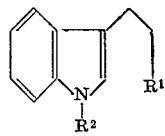
(A)

wherein R¹ is selected from the group consisting of diloweralkylamino, pyrrolidinyl, piperidino and morpholino and R² is selected from the group consisting of cyclo-(lower)alkanoyl and adamantanylcarbonyl.

The new compounds of the present invention are prepared by first treating a solution of a selected indole of the following structure:

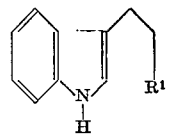
(B)

wherein R¹ has the value previously ascribed in an inert solvent such as dimethylformamide or toluene with either an alkali metal hydride or an alkali metal amide at a temperature in the range of about 25° C. to about 110° C. for a period of about 1 to about 5 hours. Thereafter, a cycloalkanoyl halide is added to the reaction mixture at a reaction temperature from about 25° C. to about 110° C. for a period of from about 12 to about 18 hours, preferably about 16 hours. The reaction mass is then extracted with either dilute aqueous hydrochloric acid or benzene to provide a crude product which may be thereafter purified according to conventional procedures such as by chromatography.

The 1-substituted bases obtained according to the foregoing reaction are then convertible to their acid salts such as the hydrochloric acid salts by treating an ethereal solution of the free base with either gaseous or isopropanolic hydrogen chloride. Other acid salts may also be prepared by treating the free base form of the compounds described with other acceptable organic or inorganic acids. Suitable acids for this purpose include hydrobromic, sulfuric, phosphoric, nitric, benzoic, methylsulfonic, p-tolylsulfonic, benzenesulfonic, naphthalenesulfonic, salicylic, glycolic, acetic, maleic, succinic, tartaric, stearic, palmitic, citric, glutaric, lactic and the like.

The starting indoles generally identified by Formula B above are known or are prepared by methods such as that disclosed by M. E. Speeter and W. C. Anthony U.S. Patent 2,870,162, (Jan. 20, 1959), and T. Vitali and F. Massini, Boll. Sci. Pac. Chim. Ind. Bologna, 17, 84–7 (1959) [C.A., 54, 19644b (1960)].

The new compounds of the present invention encompassed within those defined by the Formula A above possess quite unexpectedly, valuable pharmaceutical properties. In particular the new compounds of the present invention possess central nervous system activity and in addition possess anti-inflammatory, hypotensive and hypoglycemic activity. These new compounds are therefore useful for such purposes.

When used for the purposes described above, it may be desirable according to conventional pharmaceutical practice to combine the specific compound identified into compositions suitable for enteral or parenteral administration by combining the same with a pharmaceutically administrable organic or inorganic carrier. The composition may be prepared in solid form, such as in tablets or in liquid form such as a solution, suspension or emulsion. Suitable liquid carriers include water, gelatin, lactose, starch, talc, vegetable oils, alcohols, polyalcohols, gums, U.S.P. syrups and the like. The pharmaceutical composition in addition to the active principle and the carrier may include auxiliary materials such as coloring, stabilizing, wetting or emulsifying agents. It is of course recognized as essential that the carrier as well as any other materials present with the active principle be inert with respect thereto.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 10 mg. to about 400 mg. per day, although as aforementioned variations will occur. However, a dosage level that is in the range of from about 20 mg. to about 200 mg. per day is most desirably employed in order to achieve effective results.

Reference now to the specific examples which follow will provide a better understanding of the new compounds of the present invention as well as of the method by which the same can be prepared. In these examples hereinafter, the starting indoles used may be identified for convenience by numerals I–IV. The numerals represent the following compounds, (I) 3-[2-(1-pyrrolidinyl)ethyl] indole, (II) 3-(2-diethylaminoethyl) indole, (III) 3-(2-piperidinoethyl) indole and (IV) 3-(2-morpholinoethyl) indole.

EXAMPLE I

A solution of 8.65 g. 3-(2-diethylaminoethyl) indole (II) in 200 ml. dry dimethylformamide (DMF) is stirred with 2.30 g. ca. 50% sodium hydride/mineral oil dispersion for one hour, 6.74 g. (5.53 ml.) benzoyl chloride in 25 ml. DMF is added dropwise and the mixture is stirred at ca. 25° C. for 16 hours. Dissolution of the reaction mixture in benzene, washing of the organic solution with dilute, aqueous potassium bicarbonate solution, and then with brine, and distillation of the solvent gives an oily base. The oil is dissolved in ca. 30 ml. of 1:1 benzene/n-hexane and is chromatographically purified on a column of 250 g. neutral, activity III alumina. The base is eluted with 1:1 benzene-n-hexane and is dissolved in anhydrous ether and is treated wtih excess isopropanolic hydrogen chloride. Crystallization (twice) of the salt from acetone-ethyl acetate gives 1-benzoyl-3-(2-diethylaminoethyl) indole, hydrochloride (35%) dec. 146.5–148.5°

$\lambda^{KBr}_{max.}$ 4.12, 5.94$\mu$, $\lambda^{95\% \, EtOH}_{max.}$ 253 ($\epsilon$ 21,300), 305 ($\epsilon$ 7,290m$\mu$)

A different modification of XIV, dec. 133.0–135.5° may be isolated.

In the same manner, the following are prepared by utilizing the appropriate indole starting material and the selected reactant identified:

TABLE I

| Product: | Reactant | Dec. pt., °C. | Crystallizing Solvent | $\lambda^{KBr}_{max.}$ $\mu$ | $\lambda^{95\% \, EtOH}_{max.}$ (m$\mu$) | $\epsilon$ |
|---|---|---|---|---|---|---|
| VII | p-CH$_3$OC$_6$H$_4$COCl | 187–189 | Acetone | 3.95, 4.11 / 5.99 | 259–265 / 295–310 | 24,350 / 11,290 |
| VIII | C$_6$H$_5$SO$_2$Cl | 193.5–195.0 | do | 3.93, 4.06 / 7.34, 8.52 | 253–259 / 280–295 | 12,340 / 4,290 |
| IX | p-ClC$_6$H$_4$SO$_2$Cl | 192–194 | Acetone-ethyl acetate | 3.93, 4.09 / 7.32, 8.50 | 249–258 / 280–294 | 15,220 / 6,150 |
| XI | C$_6$H$_5$CH$_2$Cl | [3] 186–188 | Acetone | 3.93 / --- / 4.07 | 224 / 285–292 / 295–299 | 34,600 / 7,010 / 6,310 |
| XV | p-ClC$_6$H$_4$COCl | [1] 170–172 | do | 4.13 / 5.92 | 253.5 / 301–310 | 25,100 / 7,820 |
| XVI | p-CH$_3$OC$_6$H$_4$COCl | [2] 139.5–141.5 | Acetone, isopropanol | 4.22 / 5.97 | 259–265 / 296–309 | 24,050 / 11,310 |
| XVII | C$_6$H$_5$SO$_2$Cl | 191–193 | do | 3.95, 4.10 / 7.33, 8.54 | 255 / 280–294 | 12,620 / 4,250 |
| XVIII | p-ClC$_6$H$_4$SO$_2$Cl | 190.0–192.5 | Acetone | 3.92, 4.11 / 7.30, 8.52 | 254 / 281–295 | 14,960 / 5,520 |
| XIX | p-CH$_3$C$_6$H$_4$SO$_2$Cl | 183–186 | do | 3.95, 4.13 / 7.37, 8.55 | 249–258 / 281–294 | 12,820 / 5,090 |
| XX | C$_6$H$_5$CH$_2$Cl | 150–152 | Acetone, isopropanol | 4.16 / --- / --- | 224 / 285–292 / 296–298 | 34,600 / 6,780 / 6,090 |
| XXVI | p-CH$_3$C$_6$H$_4$COCl | [3] 211.5–213.0 | Acetone, isopropanol | 3.93, 4.09 / 5.91 | 254 / 306 | 23,500 / 7,250 |
| XXVII | —COCl | [3] 234–236 | Isopropanol | 3.80, 3.95 / 4.10, 5.88 / --- | 241 / 293 / 301 | 19,410 / 6,460 / 7,150 |
| XXVIII | (CH$_3$)$_2$CH(CH$_2$)$_2$COCl | Soft. 153 [3], 158–160 | Acetone | 3.82, 3.97 / 4.17, 5.91 / --- | 239.5 / 292 / 300.5 | 19,000 / 6,710 / 7,270 |
| XXIX | p-CH$_3$OC$_6$H$_4$SO$_2$Cl | [3] 184–186 | do | 3.93, 4.08 / 7.34, 8.60 / --- | 250–257 / 279–283 / 288–292 | 19,860 / 6,880 / 5,710 |
| XXX | p-CH$_3$C$_6$H$_4$COCl | 139.5–143.0 | do | 3.93, 4.20 / 5.94 | 253–259 / 305–311 | 22,230 / 6,460 |
| XXXI | 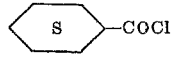—COCl | 152.5–154.5 | do | 3.98, 4.13 / 5.89 / --- | 240 / 292.5 / 301 | 19,700 / 6,310 / 7,100 |
| XXXII | (CH$_3$)$_2$CH(CH$_2$)$_2$COCl | [3] 177.5–178.5 | do | 3.97, 4.09 / 5.92 / --- | 240 / 292 / 301 | 19,260 / 6,950 / 7,600 |
| XXXIII | p-CH$_3$OC$_6$H$_4$SO$_2$Cl | 173.5–175.5 | do | 4.21, 7.33 / 8.58 / --- | 252–256 / 281–285 / 289–294 | 19,210 / 6,140 / 5,150 |

[1] Gaseous instead of isopropanolic hydrogen chloride is used to generate the salt. This is a melting point rather than a decomposition point.
[2] Crystallization from acetone affords a modification dec. 157–159° C.
[3] This is a melting point.

EXAMPLE II

A mixture of 3.22 g. (I), 70 ml. dry DMF and 0.86 g. ca. 50% sodium hydride/mineral oil dispersion is stirred 1 hour, at ca. 25° C. and 3.15 g. p-chlorobenzoyl chloride is added dropwise. After stirring 17 hours at ca. 25° C., the solvent is distilled and the residue is treated with dilute aqueous potassium carbonate solution and the mixture is extracted with benzene. Washing of the combined benzene extracts with dilute aqueous potassium carbonate solution and then with brine and removal of the solvent gives an oily base. Dissolution of the oil in anhydrous ether, addition of isopropanolic hydrogen chloride and crystallization (thrice) of the salt from acetone affords 1-p-chlorobenzoyl-3-[2-(1-pyrrolidinyl)ethyl] indole, hydrochloride (VI, 42%), M.P. 206.5–208.5° C., $\lambda^{KBr}_{max.}$ 3.93, 4.08, 5.93μ $\lambda^{95\% EtOH}_{max.}$ 252 (ε 25,120), plat. 300–310 (ε$_{305}$ 7,640) mμ

In a similar manner, the following compounds are prepared:

ing (0° C.) and the mixture is stirred at ca. 25° C. for 16 hours. Distillation of the solvent (in vacuo), dissolution of the residue in benzene, washing of the organic phase with dilute, aqueous potassium bicarbonate solution and then with brine and removal of the benzene gives the crude base. This material is dissolved in a minimum of 1:1 benzene-n-hexane and is chromatographically purified on a 250 g. column of neutral activity III alumina.

| Product | Reactant | M.P., °C. | Crystallizing solvent | $\lambda^{KBr}_{max.}$ (μ) | $\lambda^{95\% EtOH}_{max.}$ (mμ) | ε |
|---|---|---|---|---|---|---|
| XXII | p-ClC₆H₄COCl | 209–112 | Acetone | 4.14, 5.93 | 252, 301–310 | 25,050, 7,450 |
| XXIV | p-ClC₆H₄COCl | 232–234.5 | do | 3.99, 4.12, 5.93 | 253, 303–311 | 24,670, 7,290 |

The products listed below are prepared as in the preceding example except that the reaction solvent is not distilled, the crude product is extracted with benzene and the extracts are washed with dilute aqueous potassium bicarbonate solution instead of potassium carbonate solution, and gaseous hydrogen chloride is used to generate the salt.

Elution of the column with 1:1 benzene-n-hexane provides the base which is dissolved in anhydrous ether and is treated with excess isopropanolic hydrogen chloride. Crystallization (twice) of the salt from acetone yields 1-(4-methoxy) benzyl-3-[2-(1 - pyrrolidinyl)ethyl]indole, hydrochloride, (L, 35%), dec. 164–167° C.

TABLE III

| Product | Reactant | M.P., °C. | Crystallizing solvent | $\lambda^{KBr}_{max.}$ (μ) | $\lambda^{95\% EtOH}_{max.}$ (mμ) | ε |
|---|---|---|---|---|---|---|
| V | C₆H₅COCl | 244.5–247.5 | Ethanol | 3.97, 4.14, 5.97 | 251.5, 303 | 21,500, 7,380 |
| X | p-CH₃C₆H₄SO₂Cl | (Soft. 192) 195–199 | Acetone | 3.93, 4.25, 7.39, 8.58 | 250–258, 279–295 | 12,520, 5,400 |
| XII | p-ClC₆H₄CH₂Cl[1] | 192.5–195.0 | do | 3.94, 4.13 | 223, 276–291, 293, 296 | 43,500, 7,200, 6,580 |
| XXI | p-ClC₆H₄CH₂Cl[1] | [2] 127–129 | Acetone-ethyl acetate | 3.95, 4.12 | 222.5, 278–290, 294–298 | 42,800, 8,550, 7,590 |

[1] The potassium bicarbonate wash is omitted.
[2] This is a decomposition point.

EXAMPLE III

A mixture of 5.36 g. 3-[2-(1-pyrrolidinyl)ethyl] indole, 100 ml. dry dimethyl formamide (DMF) and 1.39 g. ca. 50% sodium hydride/mineral oil dispersion is stirred for 1½ hours, 4.54 g. (3.93 ml.) 4-methoxybenzyl chloride in 25 ml. DMF is added dropwise with cooling $\lambda^{KBr}_{max.}$ 3.93, 4.08μ, $\lambda^{95\% EtOH}_{max.}$ 225 (ε 39,400), 285.5 (ε 7,260) 297 sh. (ε 5,530) mμ

The following compounds are prepared in the manner described above employing etiher 3-[2-(1-pyrrolidinyl)-ethyl]indole or 3-(2-diethylaminoethyl) indole and the reactant listed.

TABLE IV

| Product | Reactant | M.P. (° C.) | Crystallizing solvent | $\lambda^{KBr}_{max.}$ (μ) | $\lambda^{95\% EtOH}_{max.}$ (mμ) | ε |
|---|---|---|---|---|---|---|
| XXXIV | p-MeOφCH₂Cl | [1] 129.5–132.0 | Ethyl acetate | 4.15 | 225.5, 282–287, 294–298 | 39,000, 6,790, 5,330 |
| XXXV | 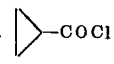—COCl | [1] 216.5–218.5 | Acetone | 3.96, 4.12, 5.92 | 241, 260–272 sh., 292, 300.5 | 22,450, 8,700, 7,150, 7,930 |
| XXXVI | 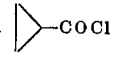—COCl | Soft. 156, 168.5–169.5 | Acetone-ethyl acetate | 3.94, 4.10, 4.25, 5.91 | 241, 258–276 sh., 292.5, 300.5 | 22,860, 9,030, 7,300, 8,030 |
| XXXVII [2] | 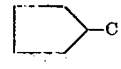—COCl | 207.5–20.09 | Acetone | 4.16, 5.89 | 240.5, 257–275 sh., 290.5, 298.5 | 20,520, 8,960, 7,410, 7,810 |
| XXXVIII | —COCl | 130–132 | Ethyl acetate | 3.98, 4.15, 4.27, 5.88 | 240, 258–274 sh., 292, 300.5 | 20,070, 8,490, 6,810, 7,540 |
| XXXIX | p-MeφCH₂Br | 183–185 | Acetone | 3.82, 3.96, 4.12 | 222.5, 286–291, 295 | 39,000, 5,960, 5,260 |
| XL | p-MeφCH₂Br | [1] 136–138 | Acetone-ethyl acetate | 3.93, 4.13 | 223, 285–291, 295 sh. | 39,200, 5,880, 5,350 |
| XLI | 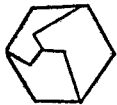—COCl | 191–193 | do | 4.15, 5.93 | 242, 260–278 sh., 293.5, 311.5 | 20,000, 9,320, 7,460, 8,180 |

TABLE IV—Continued

| Reactant | M.P. (° C.) | Crystallizing solvent | $\lambda_{max.}^{KBr}$ ($\mu$) | $\lambda_{max.}^{95\% EtOH}$ (m$\mu$) | $\epsilon$ |
|---|---|---|---|---|---|
| XLII — p-F$\phi$CH$_2$Br | 124.5–126.5 | Ethyl acetate | 3.94 | 224.5 | 35,150 |
|  |  |  | 4.07 | 267–271 | 5,320 |
|  |  |  |  | 273–285 | 6,130 |
|  |  |  |  | 286–292 | 6,560 |
| XLIII — p-F$\phi$CH$_2$Br | 178.5–180.5 | Acetone-ethyl acetate | 3.98 | 223.5 | 35,050 |
|  |  |  | 4.12 | 267–271 | 5,160 |
|  |  |  |  | 273–285 | 5,860 |
|  |  |  |  | 286–291 | 5,930 |
| XLIV — 3,4,5(MeO)$_3\phi$COCl | [1] 175–177 | Acetone | 3.98 | 257 | 18,600 |
|  |  |  | 4.17 | 311–310 | 10,270 |
|  |  |  | 5.92 |  |  |
| XLV — 3,4,5(MeO)$_3\phi$COCl | [1] 193.0–194.5 | Acetone-ethyl acetate | 4.13 | 257 | 18,300 |
|  |  |  | 5.98 | 300–310 | 10,230 |
| XLVI — 3,4-Cl$_2\phi$SO$_2$Cl | 184–186 | do | 3.82 | 238.5 | 13,300 |
|  |  |  | 3.95 | 253 | 12,520 |
|  |  |  | 4.10 | 291–296 | 4,050 |
|  |  |  | 7.25 |  |  |
|  |  |  | 8.52 |  |  |
| XLVII — 3,4-Cl$_2\phi$SO$_2$Cl | [1] 162–164 | do | 3.93 | 239 | 12,690 |
|  |  |  | 7.27 | 244–258 | 11,810 |
|  |  |  | 8.50 | 291–298 | 3,730 |
| XLVIII — 2,5-Cl$_2\phi$SO$_2$Cl | 174–177 | do | 3.82 | 252–258 | 12,070 |
|  |  |  | 3.93 | 277–285 | 5,000 |
|  |  |  | 4.11 |  |  |
|  |  |  | 7.24 |  |  |
|  |  |  | 8.51 |  |  |
| XLIX — 2,5-Cl$_2\phi$SO$_2$Cl | [1] 245.0–247.5 | Methanol-ether | 3.97 | 253–258 | 11,67 |
|  |  |  | 4.11 | 279–292 | 4,300 |
|  |  |  | 7.24 |  |  |
|  |  |  | 8.49 |  |  |

[1] This is a decomposition point.
[2] The base is eluted from the chromatographic column with 1:4 benzene/n-hexane.

EXAMPLE IV

A mixture of 5.75 g. 3-(2-piperidinoethyl)indole (III), 350 ml. dry toluene and 0.70 g. lithium amide is refluxed 4 hours, cooled to ca. 25° C. and 3.68 g. 3-dimethylaminopropyl chloride is added. After refluxing 16 hours, the mixture is filtered, the toluene solution is washed with water and the product is extracted into 2 N hydrochloric acid. Washing of the acidic extracts with ether is followed by basification of the aqueous solution with excess concentrated aqueous sodium hydroxide solution and extraction of the basic product into ether. Thorough washing of the ethereal solution with water, drying (sodium sulfate) and evaporation of the solvent affords a brown oil which is dissolved in ether and is treated with excess gaseous hydrogen chloride. The salt thus prepared is crystallized (thrice) from methanol-ethyl acetate to give 1 - (3-dimethylaminopropyl)-3-(2-piperidinoethyl)indole, dihydrochloride (XXIII, 58%) M.P. 269.5–270.5° C.

$\lambda_{max.}^{KBr}$ 4.08$\mu$, $\lambda_{max.}^{95\% EtOH}$ 224.5 ($\epsilon$ 32,680), 287 ($\epsilon$ 6,370), 296.5 (shoulder 5,310) m$\mu$ By the same procedure, the following salts are prepared:

TABLE VI

V—1-benzoyl-3-[2-(1-pyrrolidinyl)ethyl]indole;
VI—1-p-chlorobenzoyl-3-[2-(1-pyrrolidinyl)ethyl]-indole;
VII—1-(p-methoxybenzoyl)-3-[2-(1-pyrrolidinyl)ethyl]-indole;
VIII—1-phenylsulfonyl-3-[2-(1-pyrrolidinyl)ethyl]-indole;
IX—1-(p-chlorophenylsulfonyl)-3-[2-(1-pyrrolidinyl)-ethyl]indole;
X—3-[2-(1-pyrrolidinyl)ethyl]-1-(p-tolylsulfonyl)-indole;
XI—1-benzyl-3-[2-(1-pyrrolidinyl)ethyl]indole;
XII—1-p-chlorobenzyl-3-[2-(1-pyrrolidinyl)ethyl]-indole;
XIII—1-(3-dimethylaminopropyl)-3-[2-(1-pyrrolidinyl)-ethyl]indole;
XIV—1-benzoyl-3-(2-diethylaminoethyl)indole;
XV—1-p-chlorobenzoyl-3-(2-diethylaminoethyl)indole;
XVI—3-[2-(diethylamino)ethyl]-1-(p-methoxybenzoyl)-indole;
XVII—3-[2-(diethylamino)ethyl]-1-(phenylsulfonyl)-indole;

TABLE V

| Reactant | M.P., ° C. | Crystallizing solvent | $\lambda_{max.}^{KBr}$ ($\mu$) | $\lambda_{max.}^{95\% EtOH}$ (m$\mu$) | $\epsilon$ |
|---|---|---|---|---|---|
| Product: |  |  |  |  |  |
| XIII — (CH$_3$)$_2$N(CH$_2$)$_3$Cl | 238–240 | Methanolethyl acetate, acetonitrile | 3.94, 4.12 | 224.5 | 34,960 |
|  |  |  |  | 182–290 | 6,260 |
|  |  |  |  | 295 (sh) | 5,400 |
| XXV [1] — (CH$_3$)$_2$N(CH$_2$)$_3$Cl | 236.5–238.5 | Acetonitrile | 3.92, 4.12 | 224 | 32,760 |
|  |  |  |  | 287 | 5,860 |
|  |  |  |  | 295 (sh) | 5,130 |

[1] In this case, the preceding procedure does not give complete alkylation and it is necessary to retreat the crude product with toluene, lithium amide and 3-dimethylaminopropyl chloride in exactly the same manner as originally. The resulting base is purified by extraction into cold (0° C.) n-hexane. Removal of solvent gives a residue which upon dissolution in anhydrous ether and addition of excess isopropanolic hydrogen chloride affords crude XXV.

The products in the foregoing tables identified by numerals V to XLIX are more appropriately identified as the hydrochloric acid salts of the bases listed in Table VI below:

XVIII—1-(p-chlorophenylsulfonyl)-3-(2-diethylaminoethyl)indole;
XIX—3-[2-(diethylamino)ethyl]-1-(p-tolylsulfonyl)-indole;

XX—1-benzyl-3-[2-(diethylamino)ethyl]indole;
XXI—1-p-chlorobenzyl-3-(2-diethylaminoethyl)indole;
XXII—1-p-chlorobenzoyl-3-(2-piperidinoethyl)indole;
XXIII—1-(3-dimethylaminopropyl)-3-(2-piperidinoethyl)indole;
XXIV—1-p-chlorobenzoyl-3-(2-morpholinoethyl)indole;
XXV—1-(3-dimethylaminopropyl)-3-(2-morpholinoethyl)indole;
XXVI—3-[2-(1-pyrrolidinyl)-ethyl]-1-(p-toluoyl)-indole;
XXVII—1-(cyclohexylcarbonyl)-3-[2-(1-pyrrolidinyl)-ethyl]indole;
XXVIII—1-(4-methylvaleryl)-3[2-(1-pyrrolidinyl)-ethyl]indole;
XXIX—1-(p-methoxyphenylsulfonyl)-3-[2-(1-pyrrolidinyl)-ethyl]indole;
XXX—3-[2-(diethylamino)ethyl]-1-(p-toluoyl)-indole;
XXXI—1-(cyclohexylcarbonyl)-3-(2-diethylaminoethyl)indole;
XXXII—3-[2-(diethylamino)ethyl]-1-(4-methylvaleryl) indole;
XXXIII—3-(2-diethylaminoethyl)-1-(p-methoxyphenylsulfonyl)indole;
XXXIV—3-[2-diethylamino)ethyl]-1-(p-methoxybenzyl)indole;
XXXV—1-(cyclopropylcarbonyl)-3-[2-(1-pyrrolidinyl)ethyl]indole;
XXXVI—1-(cyclopropylcarbonyl)-3-[2-(diethylamino)ethyl]indole;
XXXVII—1-(cyclopentylcarbonyl)-3-[2-(1-pyrrolidinyl)ethyl]indole;
XXXVIII—1-(cyclopentylcarbonyl)-3-[2-(diethylamino)ethyl]indole;
XXXIX—1-(p-methylbenzyl)-3-[2-(1-pyrrolidinyl)ethyl]indole;
XL—3-[2-(diethylamino)ethyl]-1-(p-methylbenzyl)indole;
XLI—1-(1-adamantanecarbonyl)-3-[2-(diethylamino)ethyl]indole;
XLII—3-[2-(diethylamino)ethyl]-1-(p-fluorobenzyl)indole;
XLIII—1-(p-fluorobenzyl)-3-[2-(1-pyrrolidinyl)ethyl]indole;
XLIV—3-[2-(1-pyrrolidinyl)ethyl]-1-(3,4,5-trimethoxybenzoyl)-indole;
XLV—3-[2-(diethylamino)ethyl]-1-(3,4,5-trimethoxy-benzoyl)-indole;
XLVI—1-(3,4-dichlorophenylsulfonyl)-3-[2-(1-pyrrolidinyl)-ethyl]indole;
XLVII—1-(3,4-dichlorophenylsulfonyl)-3-[2-(diethylamino)-ethyl]indole;
XLVIII—1-(2,5-dichlorophenylsulfonyl)-3-[2-(1-pyrrolidinyl)-ethyl]indole;
XLIX—1-(2,5-dichlorophenylsulfonyl)-3-[2-(diethylamino)-ethyl]indole.

EXAMPLE V

The procedure of the above Examples I to IV is repeated to prepare the following 1-substituted-3-(2-substituted ethyl)indoles from the corresponding starting compounds:
1-(p-butoxybenzyl)-3-[2-(diethylamino)-ethyl]indole;
1-(p-bromobenzyl)-3-(2-diethylaminoethyl)indole;
3-(2-diethylaminoethyl)-1-(m-iodobenzyl)indole;
1-(3,4,5-triethoxybenzoyl)-3-[2-(1-pyrrolidinyl)ethyl]indole;
1-(p-fluorobenzoyl)-3-(2-morpholinoethyl)indole;
1-(m-iodobenzoyl)-3-(2-morpholinoethyl)indole;
1-(p-bromophenylsulfonyl)-3-[2-(1-pyrrolidinyl)-ethyl]indole;
1-(p-iodophenylsulfonyl)-3-[2-(1-pyrrolidinyl)-ethyl]indole;
1-(2,5-dibromophenylsulfonyl)-3-[2-(1-pyrrolidinyl)ethyl]indole; and
1-(p-propylphenylsulfonyl)-3-[2-(1-pyrrolidinyl) ethyl]indole.

What is claimed is:
1. A compound selected from the group consisting of a compound having the formula:

wherein $R^1$ is selected from the group consisting of dilower-alkylamino, pyrrolidino, piperidino and morpholino and $R^2$ is selected from the group consisting of cyclo(lower)alkanoyl and adamantanylcarbonyl and the non-toxic, therapeutically administrable acid addition salts thereof.

2. 1-(cyclohexylcarbonyl) - 3 - (2 - (1 - pyrrolidinyl) ethyl) indole.

3. 1-(cyclohexylcarbonyl)-3-(2-diethylaminoethyl) indole.

References Cited

UNITED STATES PATENTS 3,075,992  1/1963  Hofmann et al. 160—326.15 XR

ALEX MAZEL, Primary Examiner
J. A. NARCAVAGE, Assistant Examiner

U.S. Cl. X.R.

260—247.1, 247.2, 247.5, 247.7, 293.4, 294, 294.7, 326.12; 424—248, 267, 274